(12) United States Patent
Tan et al.

(10) Patent No.: US 10,760,448 B2
(45) Date of Patent: Sep. 1, 2020

(54) DEEP LEARNING REGULATION AND CONTROL AND ASSEMBLY METHOD AND DEVICE FOR LARGE-SCALE HIGH-SPEED ROTARY EQUIPMENT BASED ON DYNAMIC VIBRATION RESPONSE PROPERTIES

(71) Applicant: Harbin Institute of Technology, Harbin (CN)

(72) Inventors: Jiubin Tan, Harbin (CN); Yongmeng Liu, Harbin (CN); Chuanzhi Sun, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 41 days.

(21) Appl. No.: 16/375,142

(22) Filed: Apr. 4, 2019

(65) Prior Publication Data

US 2020/0217218 A1   Jul. 9, 2020

(30) Foreign Application Priority Data

Jan. 7, 2019   (CN) .......................... 2019 1 0012273

(51) Int. Cl.
    *F01D 25/04*    (2006.01)
    *G05B 13/02*    (2006.01)
    (Continued)

(52) U.S. Cl.
    CPC .............. *F01D 25/04* (2013.01); *F02C 9/00* (2013.01); *G05B 13/027* (2013.01); *G06N 3/02* (2013.01);
    (Continued)

(58) Field of Classification Search
None
See application file for complete search history.

(56) References Cited

U.S. PATENT DOCUMENTS

| | | | | | |
|---|---|---|---|---|---|
| 5,742,139 | A | * | 4/1998 | Kolomeitsev | ........... H02P 25/08 318/254.2 |
| 5,966,927 | A | * | 10/1999 | Wilson | .................... F01D 5/021 60/39.43 |

(Continued)

*Primary Examiner* — Ramesh B Patel
(74) *Attorney, Agent, or Firm* — IPro, PLLC

(57) ABSTRACT

The present invention provides a deep learning regulation and control and assembly method and device for large-scale high-speed rotary equipment based on dynamic vibration response properties. The present invention starts from geometrical deviation of multiple stages of rotor/stator of an aircraft engine, amount of unbalance of rotor/stator, rigidity of rotor/stator and vibration amplitude of rotor/stator, considers the influence of the area of the assembly contact surface between two stages of rotors/stators, and sets the rotation speed of rotor/stator to be the climbing rotation speed to obtain vibration amplitude parameters. According to the calculation method of the coaxiality, amount of unbalance, rigidity and vibration amplitude of multiple stages of rotor/stator, an objective function taking assembly phases as variables is established, a Monte Carlo method is used to solve the objective function, and a probability density function is solved according to a drawn distribution function to obtain the probability relationship between the contact surface runout of the rotor/stator of the aircraft engine and the final coaxiality, amount of unbalance, rigidity and vibration amplitude of multiple stages of rotor/stator, thereby realizing assembly optimization and distribution of tolerances of multiple stages of rotor/stator.

5 Claims, 3 Drawing Sheets

(51) Int. Cl.
*F02C 9/00* (2006.01)
*G06N 3/02* (2006.01)
*G06N 20/00* (2019.01)
*G06N 3/08* (2006.01)

(52) U.S. Cl.
CPC .. *F05D 2220/323* (2013.01); *F05D 2270/303* (2013.01); *F05D 2270/311* (2013.01); *F05D 2270/334* (2013.01); *F05D 2270/44* (2013.01); *F05D 2270/709* (2013.01); *G06N 3/08* (2013.01); *G06N 20/00* (2019.01)

(56) References Cited

U.S. PATENT DOCUMENTS

| | | | | |
|---|---|---|---|---|
| 6,000,840 | A * | 12/1999 | Paterson | B01F 7/164 241/46.11 |
| 6,105,359 | A * | 8/2000 | Wilson | F01D 5/021 60/772 |
| 6,164,908 | A * | 12/2000 | Nishida | F01D 9/02 415/173.7 |
| 9,145,945 | B2 * | 9/2015 | Tan | F16F 15/023 |
| 2010/0023307 | A1 * | 1/2010 | Lee | G06K 9/6226 703/7 |
| 2016/0019459 | A1 * | 1/2016 | Audhkhasi | G06N 3/08 706/22 |
| 2016/0034814 | A1 * | 2/2016 | Audhkhasi | G06N 3/08 706/12 |
| 2017/0167866 | A1 * | 6/2017 | Wang | F01D 25/285 |
| 2017/0175584 | A1 * | 6/2017 | Tan | F01D 5/027 |
| 2019/0242774 | A1 * | 8/2019 | Trukenmueller | F16F 15/322 |
| 2019/0243735 | A1 * | 8/2019 | He | G06N 3/0454 |

* cited by examiner

DEEP LEARNING REGULATION AND CONTROL AND ASSEMBLY METHOD AND DEVICE FOR LARGE-SCALE HIGH-SPEED ROTARY EQUIPMENT BASED ON DYNAMIC VIBRATION RESPONSE PROPERTIES

TECHNICAL FIELD

The present invention belongs to the technical field of mechanical assembly and particularly relates to a deep learning regulation and control and assembly method and device for large-scale high-speed rotary equipment based on dynamic vibration response properties.

BACKGROUND ART

At high rotation speed of an aircraft engine in working, the dynamic properties of the aircraft engine directly influence the engine performance. According to statistics, more than 70% of aircraft engine failures are related to vibration. Severe vibration may cause great influence on the performance of the aircraft engine and even cause flight accidents, causing casualties and great economic losses. Therefore, it is urgent to solve the problem that the high-speed vibration amplitude of the aircraft engine during assembly is out of tolerance.

Suzhou Dongling Vibration Test Instrument Co., Ltd. invented an aircraft engine vibration control experiment platform which comprises an experiment platform base, an aircraft engine body, a driving system, a measurement and control system and a safety protection device, wherein a first driving motor of the driving system transmits power to a low-pressure rotor system of the aircraft engine body through a first coupler; a second driving motor transmits power to a high-pressure rotor system of the aircraft engine body through a second coupler and an accessory drive system of the aircraft engine body; a motor output shaft, the low-pressure rotor system and the high-pressure rotor system are provided with capacitive displacement sensors; and a two-stage casing, a three-stage casing, a six-stage casing, a combustor casing and a high-pressure turbine casing corresponding to five support bearings of the aircraft engine are provided with three-way vibration acceleration sensors. The experiment platform can be used for testing and analyzing multi-factor coupled vibration problems of the aircraft engine, and is widely applicable to the study of vibration properties and vibration control strategies of a dual-rotor system of the aircraft engine. The experiment platform has the defect that it does not comprehensively consider various key index factors of the aircraft engine to obtain a global optimal scheme.

The Northwestern Polytechnical University provided a method for improving vibration monitoring accuracy of multi-rotor aircraft engines. The method adopts the process of dynamically optimizing the sampling rate and sampling number to simultaneously avoid 'spectral leakage' at the fundamental frequency of each rotor and improve the amplitude value testing accuracy, thereby achieving engine failure diagnosis and providing a technical basis for on-site dynamic balance. The method has the defects that it does not fully consider the actual structure of the engine and the specific geometrical parameter values of the engine and does not accurately calculate the vibration conditions and the high-speed response properties of the aircraft engine through kinetic equations.

The above methods both have the following problems: only single objective optimization of the coaxiality is performed solely, the established coaxiality model does not consider the rotation errors around the X-axis and the Y-axis and does not consider the unbalance parameter and the rigidity parameter, and a comprehensive measuring model of coaxiality, amount of unbalance, rigidity and high-speed vibration response is not established, so distribution of coaxiality, amount of unbalance, rigidity and high-speed vibration response of multiple stages of rotor/stator of the aircraft engine cannot be realized.

SUMMARY OF THE INVENTION

In order to solve the existing technical problems, the present invention provides a deep learning regulation and control and assembly method and device for large-scale high-speed rotary equipment based on dynamic vibration response properties, to solve the problem of large engine vibration and realize optimization and distribution of tolerances of multiple stages of rotor/stator of an aircraft engine.

The deep learning regulation and control and assembly method for large-scale high-speed rotary equipment based on dynamic vibration response properties of the present invention is realized through the following technical scheme:

step 1: establishing coaxiality, amount of unbalance, rigidity and vibration amplitude models after multi-stage rotor and stator assembly;

step 2: generating 10000 groups of contact surface runout data of each stage of rotor and stator according to a Monte Carlo method, substituting random numbers into coaxiality, amount of unbalance, rigidity and vibration amplitude formulae of multiple stages of rotor/stator, rotating the rotation angle of each stage of rotor and stator to obtain 10000 groups of coaxiality, amount of unbalance, rigidity and vibration amplitude parameters of multiple stages of rotor/stator, and solving a probability density function according to a drawn distribution function to obtain the probability relationship between the contact surface runout of the rotor/stator of an aircraft engine and the final coaxiality, amount of unbalance, rigidity and vibration amplitude of multiple stages of rotor/stator, thereby realizing distribution of tolerances of multiple stages of rotor/stator;

step 3: establishing a BP neural network prediction model to accurately predict the coaxiality, amount of unbalance, rigidity and vibration amplitude after rotor and stator assembly, thereby realizing optimization of multi-stage rotor and stator assembly.

Further, the step 1 is specifically as follows:

in multi-stage rotor and stator assembly, single-stage rotor and stator localization and orientation errors are transmitted and accumulated so as to influence the accumulated eccentric error after multi-stage rotor and stator assembly, wherein after n-stage rotor and stator assembly, the accumulated eccentric error of the kth stage of rotor and stator caused by localization and orientation errors of each stage of rotor and stator is expressed as:

$$\begin{bmatrix} dx_{0-k} \\ dy_{0-k} \\ dz_{0-k} \end{bmatrix} = \sum_{i=1}^{k} \left( \prod_{j=2}^{i} S_{rj-1} S_{xj-1} S_{yj-1} \right) S_{ri}(p_i + dp_i), k = 1, 2, \ldots, n$$

where $dx_{0-k}$ is the accumulative eccentricity error of the circle center a measuring surface of the kth stage of rotor and stator in the X-axis direction after n-stage rotor and stator assembly; $dy_{0-k}$ is the accumulative eccentricity error of the circle center of the measuring surface of the kth stage of rotor and stator in the Y-axis direction after n-stage rotor and stator assembly; $dz_{0-k}$ is the accumulative eccentricity error of the circle center of the measuring surface of the kth stage of rotor and stator in the Z-axis direction after n-stage rotor and stator assembly; $p_i$ is an ideal location vector of the center of a circle of a radial measuring surface of the ith stage of rotor and stator; $dp_i$ is a processing error vector of the center of a circle of the radial measuring surface of the ith stage of rotor and stator; $S_{ri}$ is a rotation matrix of the ith stage of rotor and stator rotating by a $\theta_{ri}$ angle around the Z-axis; $S_{r1}$ is a unit matrix; $S_{xj-1}$ is a rotation matrix of the (j-1)th stage of rotor and stator rotating by a $\theta_{xj-1}$ angle around the X-axis; $S_{yj-1}$ is a rotation matrix of the (j-1)th stage of rotor and stator rotating by a $\theta_{yj-1}$ angle around the Y-axis; and $S_{rj-1}$ is a rotation matrix of the (j-1)th stage of rotor and stator rotating by a $\theta_{rj-1}$ angle around the Z-axis;

according to the ISO standard definition of the coaxiality, the expression of the coaxiality after n-stage rotor and stator assembly is:

$$\text{coaxiality} = \max\{2\sqrt{dx^2_{0-k} + dy^2_{0-k}}, k=1,2,\ldots,n\}$$

in multi-stage rotor and stator assembly, the amount of unbalance of the nth stage of rotor and stator caused by localization and orientation errors of each stage of rotor and stator is expressed as:

$$\begin{bmatrix} Ux_{0-n} \\ Uy_{0-n} \end{bmatrix} = \begin{bmatrix} m_{0-n} & 0 & 0 \\ 0 & m_{0-n} & 0 \end{bmatrix} \cdot \sum_{i=1}^{n}\left(\prod_{j=2}^{i} S_{rj-1} S_{xj-1} S_{yj-1}\right) S_{ri}(p_i + dp_i)$$

where $Ux_{0-n}$ is the amount of unbalance of a measuring surface of the nth stage of rotor and stator in the X-axis direction after assembly; $Uy_{0-n}$ is the amount of unbalance of the measuring surface of the nth stage of rotor and stator in the Y-axis direction after assembly; $m_{0-n}$ is the mass of the nth stage of rotor and stator after assembly;

the amount of unbalance of a single stage of rotor and stator and the amount of unbalance introduced by localization and orientation errors in the assembly process are subjected to vector addition to obtain single-stage amount of unbalance, the amount of unbalance of each stage of rotor and stator is separately projected to two correction surfaces, and initial amount of unbalance of multiple stages of rotor/stator is obtained according to a dynamic balance formula, thereby realizing calculation of the initial amount of unbalance of multiple stages of rotor/stator;

in multi-stage rotor and stator assembly, the sectional inertia moment I of an assembly contact surface between two stages of rotors/stators is:

$$I = \pi*(R^4-r^4)/64 - 2*\int_0^{de}\int_0^{d\theta}\pi*(R^4-r^4)/64 \, de \, d\theta$$

where R is the contact surface outer diameter, r is the contact surface inner diameter, eccentricity $de = \sqrt{(dx_{0-k})^2 + (dx_{0-k})^2}$, eccentric angle $d\theta = \arctan(dy_{0-k}/dX_{0-k})$, rotor and stator bending rigidity is EI, E being elastic modulus of the material; and the kinetic equation of rotor and stator axis elements in a fixed coordinate system is:

$$(M_T^e + M_R^e)\ddot{q}^e - \Omega G^e \dot{q}^e + K_B^e q^e = Q^e$$

where $M_T^e$ is a mass matrix, $M_R^e$ is an inertia matrix, $G^e$ is a gyroscopic effect matrix, $\Omega$ is rotational angular speed of rotor/stator, $q^e$ is a generalized displacement vector, $K_B^e$ is a rigidity matrix; $Q^e$ is external force received by the system; the superscript e represents an axis element; the bending rigidity constitutes the rigidity matrix, the rotation speed of rotor/stator is set to be climbing rotation speed, and a finite element method is used to solve vibration amplitude parameters of the rotor and stator system.

Further, the climbing rotation speed is 70%-85% of the maximum rotation speed.

Further, the step 3 specifically includes: based on multi-factor coupling properties of temperature, humidity, tightening torque, orientation error, localization error, amount of unbalance measuring error, cross-sectional area, correction surface location, bolt tightening sequence, material elastic modulus, rotor and stator height, contact surface radius, dynamic rigidity, rotation speed and bearing support rigidity in the assembly process of the large-scale high-speed rotary equipment, establishing a deep learning neural network prediction model taking the error factors of temperature, humidity, tightening torque, orientation error, localization error, amount of unbalance measuring error, cross-sectional area, correction surface location, bolt tightening sequence, material elastic modulus, rotor and stator height, contact surface radius, dynamic rigidity, rotation speed and bearing support rigidity of each stage of large-scale high-speed rotary equipment as input variables and taking coaxiality, amount of unbalance, rigidity and vibration amplitude of the large-scale high-speed rotary equipment after assembly as output variables.

The present invention also provides a device for realizing the deep learning regulation and control and assembly method for the large-scale high-speed rotary equipment based on dynamic vibration response properties. The device includes a base 1, an air flotation shaft system 2, a static balance measuring platform 3, an aligning and tilt regulating workbench 4, a left upright column 5, a right upright column 6, a left lower transverse measuring rod 7, a left lower telescopic inductive sensor 8, a left upper transverse measuring rod 9, a left upper telescopic inductive sensor 10, a right lower transverse measuring rod 11, a right lower lever type inductive sensor 12, a right upper transverse measuring rod 13, a right upper lever type inductive sensor 14, a door type cross beam 15, a longitudinal measuring rod 16 and a middle telescopic inductive sensor 17; the air flotation shaft system 2 is nested in the center position of the base 1; the static balance measuring platform 3 is arranged in the center position of the air flotation shaft system 2; the static balance measuring platform 3 includes a lower plate 3a of the static balance measuring platform, an upper plate 3b of the static balance measuring platform, two guide rods 3c, 3d, four driving rods 3e, 3f, 3g, 3h and three precise force sensors 3i, 3j, 3k; the two guide rods 3c, 3d are uniformly arranged on the lower plate 3a of the static balance measuring platform at an equal interval; the four driving rods 3e, 3f, 3g, 3h are uniformly arranged on the lower plate 3a of the static balance measuring platform at equal intervals; the upper plate 3b of the static balance measuring platform sleeves the two guide rods 3c, 3d; the three precise force sensors 3i, 3j, 3k are uniformly arranged on the upper plate 3b of the static balance measuring platform at equal intervals; the aligning and tilt regulating workbench 4 is arranged in the center position of the static balance measuring platform 3; the left upright column 5 and the right upright column 6 are symmetrically distributed at two sides of the air flotation shaft system 2 and are fixedly arranged on the base 1; the left upright column 5 is sleeved with the left upper transverse measuring rod 9 and the left lower transverse measuring rod 7 sequentially from the top to bottom in a mode of movable regulation; the left upper telescopic inductive sensor 10 is fixedly connected to the left upper transverse measuring rod 9; the left lower telescopic inductive sensor 8 is fixedly connected to the left lower transverse measuring rod 7; the right upright column 6 is sleeved with the right upper transverse measuring rod 13 and the right lower transverse measuring rod 11 sequentially from top to bottom in a mode of movable regulation; the right upper lever type inductive sensor 14 is fixedly connected to the right upper transverse measuring rod 13; the right lower lever type inductive sensor 12 is fixedly connected to the right lower transverse measuring rod 11; two ends of the door type cross beam 15 are fixedly connected to the upper end of the left upright column 5 and the upper end of the right upright column 6; the door type cross beam 15 is sleeved with the longitudinal measuring rod 16 in a mode of movable regulation; and the middle telescopic inductive sensor 17 is fixedly connected to the longitudinal measuring rod 16.

DETAILED DESCRIPTION OF THE INVENTION

The technical schemes in the embodiments of the present invention are clearly and completely described below with reference to the accompanying drawings in the embodiments of the present invention. Obviously, the described embodiments are only a part of the embodiments of the present invention but not all of the embodiments. Based on the embodiments in the present invention, all other embodiments obtained by a person of ordinary in the art without creative efforts belong to the scope of protection of the present invention.

Figure 1:
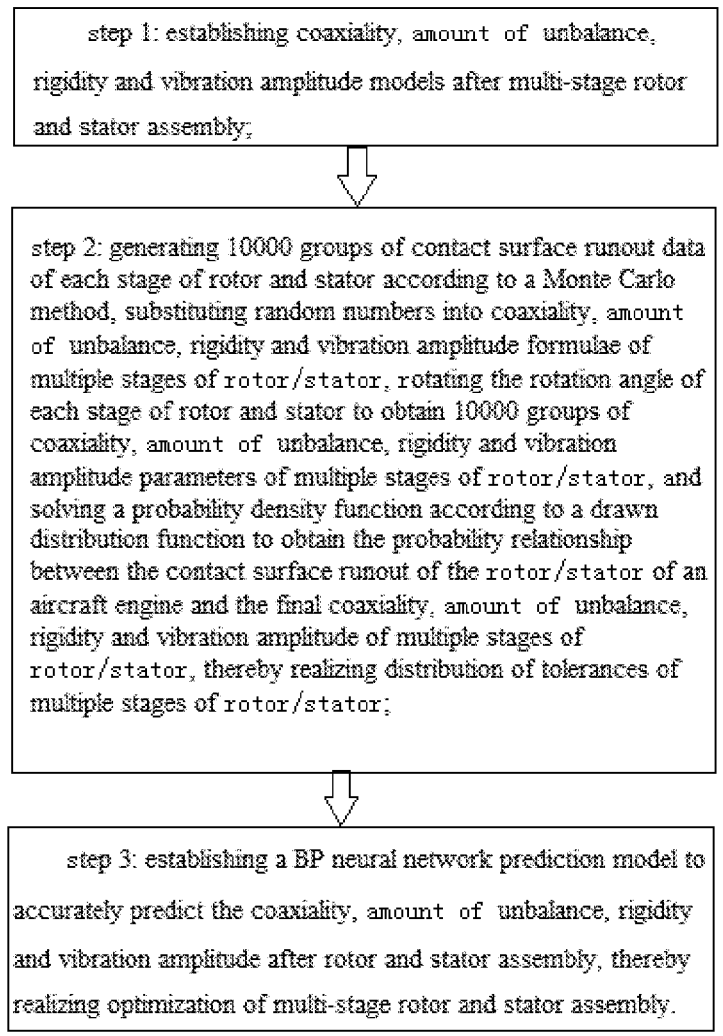
FIG. 1 is a flow diagram of a deep learning regulation and control and assembly method for large-scale high-speed rotary equipment based on dynamic vibration response properties.

Referring to FIG. 1, the present invention provides a deep learning regulation and control and assembly method for large-scale high-speed rotary equipment based on dynamic vibration response properties.

Step 1: establish coaxiality, amount of unbalance, rigidity and vibration amplitude models after multi-stage rotor and stator assembly;

the step 1 is specifically as follows:

in multi-stage rotor and stator assembly, single-stage rotor and stator localization and orientation errors are transmitted and accumulated so as to influence the accumulated eccentric error after multi-stage rotor and stator assembly, wherein after n-stage rotor and stator assembly, the accumulated eccentric error of the kth stage of rotor and stator caused by localization and orientation errors of each stage of rotor and stator is expressed as:

$$\begin{bmatrix} dx_{0-k} \\ dy_{0-k} \\ dz_{0-k} \end{bmatrix} = \sum_{i=1}^{k} \left( \prod_{j=2}^{i} S_{rj-1} S_{xj-1} S_{yj-1} \right) S_{ri}(p_i + dp_i), k = 1, 2, \ldots, n$$

where $dx_{0-k}$ is the accumulative eccentricity error of the circle center of a measuring surface of the kth stage of rotor and stator in the X-axis direction after n-stage rotor and stator assembly; $dy_{0-k}$ is the accumulative eccentricity error of the circle center of the measuring surface of the kth stage of rotor and stator in the Y-axis direction after n-stage rotor and stator assembly; $dz_{0-k}$ is the accumulative eccentricity error of the circle center of the measuring surface of the kth stage of rotor and stator in the Z-axis direction after n-stage rotor and stator assembly; $p_i$ is an ideal location vector of the center of a circle of a radial measuring surface of the ith stage of rotor and stator; $dp_i$ is a processing error vector of the center of a circle of the radial measuring surface of the ith stage of rotor and stator; $S_{ri}$ is a rotation matrix of the ith stage of rotor and stator rotating by a $\theta_{ri}$ angle around the Z-axis; $S_{xj-1}$ is a rotation matrix of the (j-1)th stage of rotor and stator rotating by a $\theta_{xj-1}$ angle around the X-axis; $S_{yj-1}$ is a rotation matrix of the (j-1)th stage of rotor and stator rotating by a $\theta_{yj-1}$ angle around the Y-axis; $S_{rj-1}$ is a rotation matrix of the (j-1)th stage of rotor and stator rotating by a $\theta_{rj-1}$ angle around the Z-axis;

according to the ISO standard definition of the coaxiality, the expression of the coaxiality after n-stage rotor and stator assembly is:

$$\text{coaxiality} = \max\{2\sqrt{dx^2_{0-k} + dy^2_{0-k}}, k=1,2,\ldots,n\}$$

in multi-stage rotor and stator assembly, the amount of unbalance of the nth stage of rotor and stator caused by localization and orientation errors of each stage of rotor and stator is expressed as:

$$\begin{bmatrix} Ux_{0-n} \\ Uy_{0-n} \end{bmatrix} = \begin{bmatrix} m_{0-n} & 0 & 0 \\ 0 & m_{0-n} & 0 \end{bmatrix} \cdot \sum_{i=1}^{n} \left( \prod_{j=2}^{i} S_{rj-1} S_{xj-1} S_{yj-1} \right) S_{ri}(p_i + dp_i)$$

where $Ux_{0-n}$ is the amount of unbalance of a measuring surface of the nth stage of rotor and stator in the X-axis direction after assembly; $Uy_{0-n}$ is the amount of unbalance of the measuring surface of the nth stage of rotor and stator in the Y-axis direction after assembly; $m_{0-n}$ is the mass of the nth stage of rotor and stator after assembly; and the amount of unbalance of a single stage of rotor and stator and the amount of unbalance introduced by localization and orientation errors in the assembly process are subjected to vector addition to obtain single-stage amount of unbalance, the amount of unbalance of each stage of rotor and stator is separately projected to two correction surfaces, and initial amount of unbalance of multiple stages of rotor/stator is obtained according to a dynamic balance formula, thereby realizing calculation of the initial amount of unbalance of multiple stages of rotor/stator;

in multi-stage rotor and stator assembly, the sectional inertia moment I of an assembly contact surface between two stages of rotors/stators is:

$$I = \pi*(R^4 - r^4)/64 - 2*\int_0^{de}\int_0^{d\theta}\pi*(R^4 - r^4)/64\, de\, d\theta$$

where R is the contact surface outer diameter, r is the contact surface inner diameter, eccentricity $de = \sqrt{(dx_{0-k})^2 + (dy_{0-k})^2}$, eccentric angle $d\theta = \arctan(dy_{0-k}/dx_{0-k})$, rotor and stator bending rigidity is EI, E being elastic modulus of the material;

the kinetic equation of rotor and stator axis elements in a fixed coordinate system is:

$$(M_T^e + M_R^e)\ddot{q}^e - \Omega G^e \dot{q}^e + K_B^e q^e = Q^e$$

where $M_T^e$ is a mass matrix, $M_R^e$ is an inertia matrix, $G^e$ is a gyroscopic effect matrix, $\Omega$ is rotational angular speed of rotor/stator, $q^e$ is a generalized displacement vector, $K_B^e$ is a rigidity matrix; $Q^e$ is external force received by the system; superscript e represents an axis element; the bending rigidity constitutes the rigidity matrix, the rotation speed of rotor/stator is set to be climbing rotation speed, and a finite element method is used to solve vibration amplitude parameters of the rotor and stator system. The climbing rotation speed is 70%-85% of the maximum rotation speed.

Step 2: generate 10000 groups of contact surface runout data of each stage of rotor and stator according to a Monte Carlo method, substitute random numbers into coaxiality, amount of unbalance, rigidity and vibration amplitude formulae of multiple stages of rotor/stator, rotate the rotation angle of each stage of rotor and stator to obtain 10000 groups of coaxiality, amount of unbalance, rigidity and vibration amplitude parameters of multiple stages of rotor/stator, and solve a probability density function according to a drawn distribution function to obtain the probability relationship between the contact surface runout of the rotor/stator of an aircraft engine and the final coaxiality, amount of unbalance, rigidity and vibration amplitude of multiple stages of rotor/stator, thereby realizing distribution of tolerances of multiple stages of rotor/stator.

Step 3: establish a BP neural network prediction model to accurately predict the coaxiality, amount of unbalance, rigidity and vibration amplitude after rotor and stator assembly, thereby realizing optimization of multi-stage rotor and stator assembly.

In the actual assembly process, rotor/stator are connected through many bolts with high strength. In the process of tightening the bolts, due to non-uniformity of the pre-tightening force of bolt groups, bolt connection surfaces of rotor/stator generate irregular deformation coupled with geometrical processing errors of rotor/stator so as to cause deviation between a model prediction value and an actual value. In addition, temperature and humidity in the assembly environment also generate certain influence on the final assembly result. In order to comprehensively consider all influence factors in the rotor and stator assembly process to reduce the deviation between the model prediction value and the actual assembly value, the BP neural network prediction model is established to realize accurate prediction of coaxiality, amount of unbalance, rigidity and vibration amplitude after rotor and stator assembly.

The step 3 specifically includes: based on multi-factor coupling properties of temperature, humidity, tightening torque, orientation error, localization error, amount of unbalance measuring error, cross-sectional area, correction surface location, bolt tightening sequence, material elastic modulus, rotor and stator height, contact surface radius, dynamic rigidity, rotation speed and bearing support rigidity in the assembly process of the large-scale high-speed rotary equipment, establishing a deep learning neural network prediction model taking the error factors of temperature, humidity, tightening torque, orientation error, localization error, amount of unbalance measuring error, cross-sectional area, correction surface location, bolt tightening sequence, material elastic modulus, rotor and stator height, contact surface radius, dynamic rigidity, rotation speed and bearing support rigidity of each stage of large-scale high-speed rotary equipment as input variables and taking coaxiality, amount of unbalance, rigidity and vibration amplitude of the large-scale high-speed rotary equipment after assembly as output variables.

Four stages of simulation rotors are utilized for actually assembling 5000 data, one network hidden layer is arranged, the number of nodes in the hidden layer is 50, the maximum training frequency is set to be 10000, the training objective minimum deviation is set to be 0.0004, and the initial value of a learning factor is 0.01 and is incremented by 3 times, to observe the network convergence effect and the operating efficiency. Experiments show that when the learning factor is 0.09, on the premise that the convergence is ensured and the prediction accuracy meets the requirement, the network reaches the maximum operating efficiency. A network model error performance curve is as shown in FIG. 4.

Figure 4:
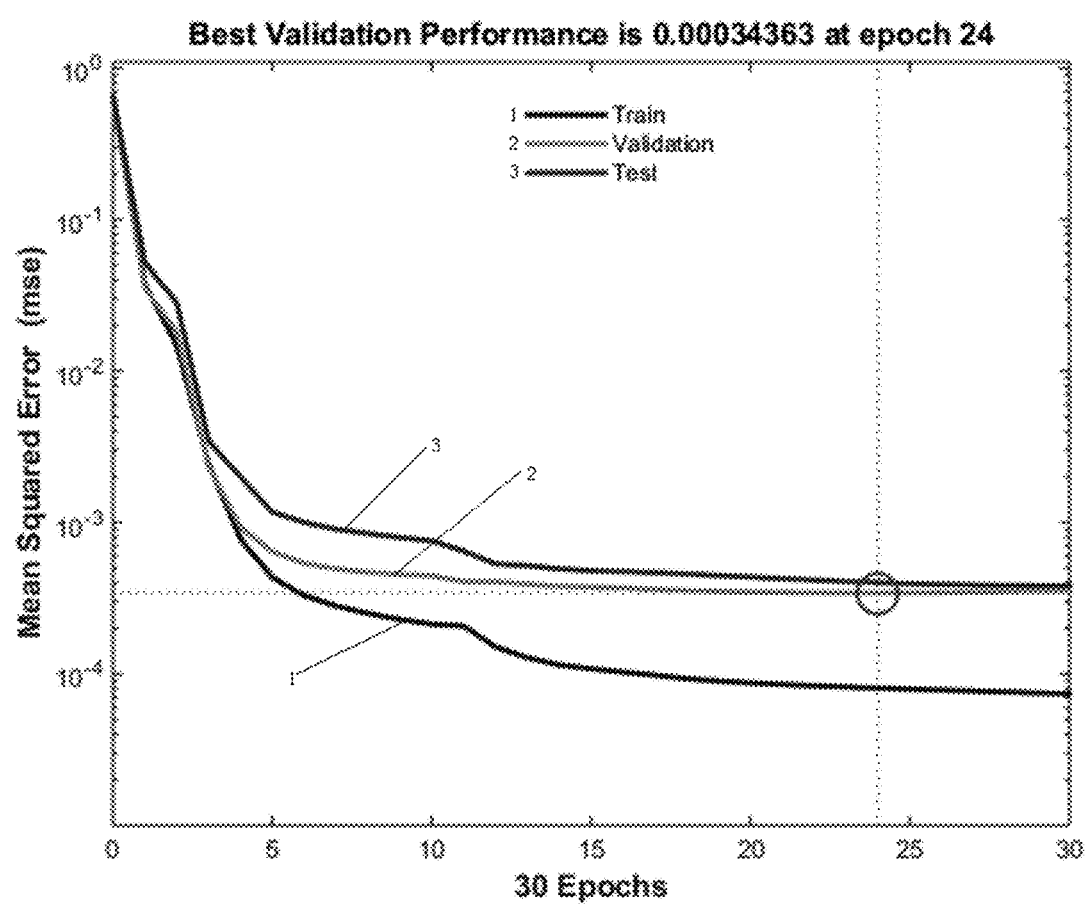
FIG. 4 is a curve chart of error performance of a BP neural network prediction model.

Seen from FIG. 4:

1) With the increase of the number of iterations, minimum mean square errors of network model training, cross validation and testing gradually decrease. When iterating to the fifth generation, the training error is $10^{-3.5}$, the cross validation error is $10^{-3.3}$, and the testing error is $10^{-3}$; and when iterating to the twenty-fourth generation, the training error is $10^{-4.2}$, the cross validation error is $10^{-3.5}$, and the testing error $10^{-3.3}$. Furthermore, the minimum mean square errors of the network model training, cross validation and testing continuously decrease in the iteration process, therefore, the network model convergence does not fall into over-fitting or under-fitting.

2) With the increase of the number of iterations, the difference between testing and cross validation errors of the network model gradually decreases. When iterating to the fifth generation, the difference is 0.0005; and when iterating to the twenty-fourth generation, the difference is 0.0002. Therefore, algorithm convergence conditions are met to realize algorithm convergence. Intelligent assembly of multi-stage large-scale high-speed rotary equipment is realized.

Figure 2:
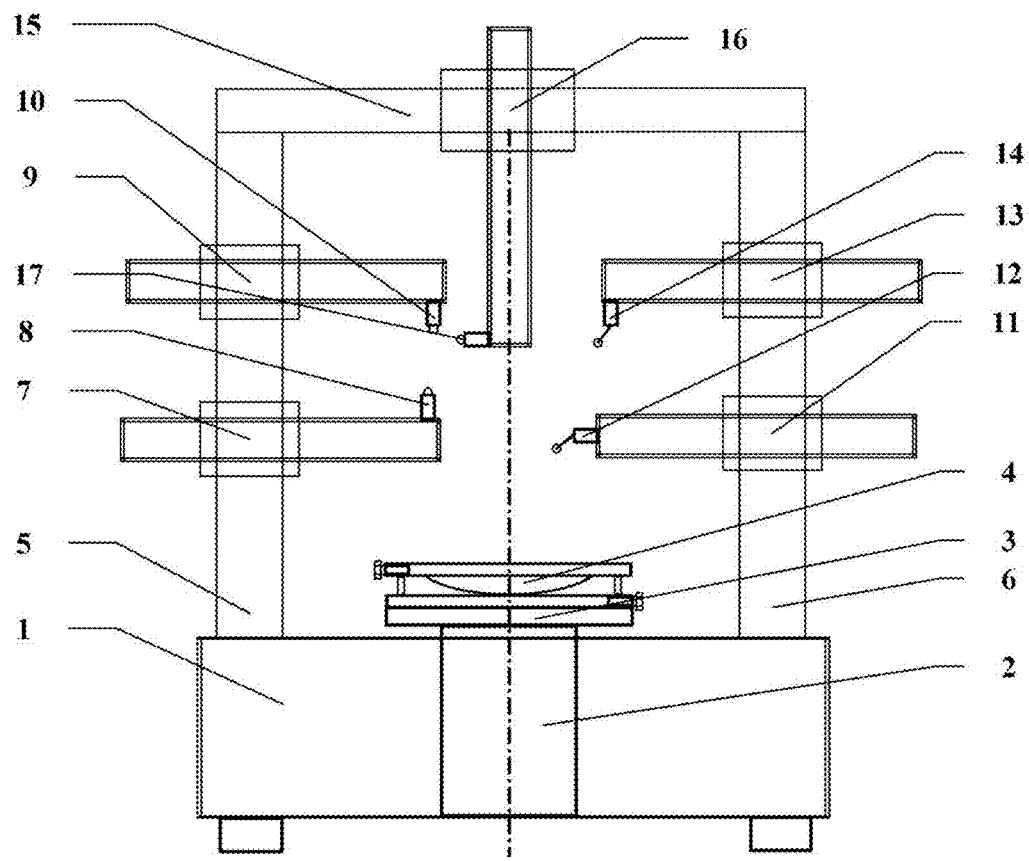
FIG. 2 is a schematic diagram of a device for realizing the deep learning regulation and control and assembly method for the large-scale high-speed rotary equipment based on dynamic vibration response properties.
Figure 3:
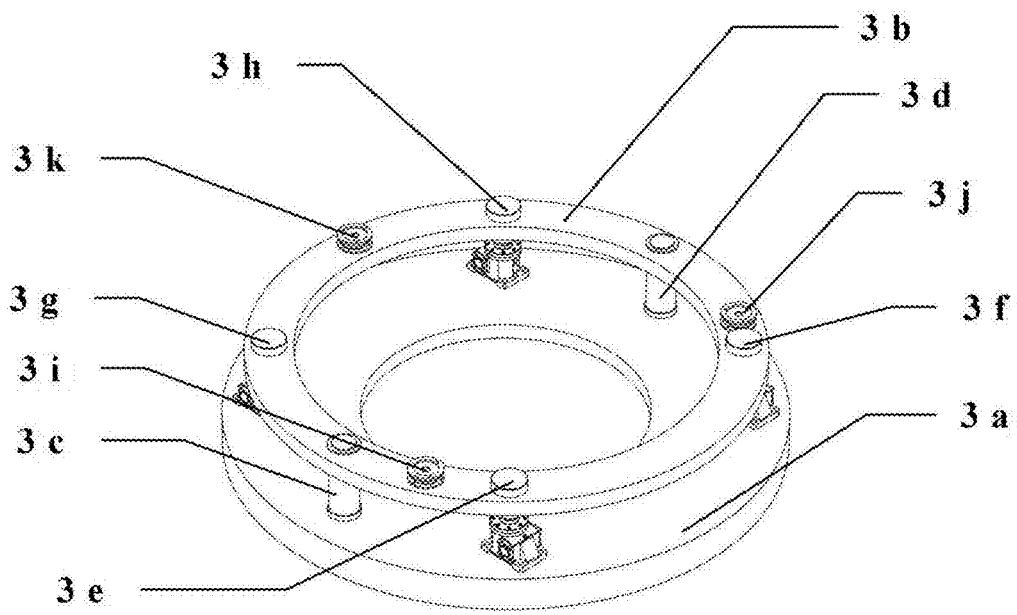
FIG. 3 is a schematic diagram of a static balance measuring platform of the present invention.

Referring to FIG. 2 and FIG. 3, the present invention also provides a device for realizing the deep learning regulation and control and assembly method for the large-scale high-speed rotary equipment based on dynamic vibration response properties. The device includes a base 1, an air flotation shaft system 2, a static balance measuring platform 3, an aligning and tilt regulating workbench 4, a left upright column 5, a right upright column 6, a left lower transverse measuring rod 7, a left lower telescopic inductive sensor 8, a left upper transverse measuring rod 9, a left upper telescopic inductive sensor 10, a right lower transverse measuring rod 11, a right lower lever type inductive sensor 12, a right upper transverse measuring rod 13, a right upper lever type inductive sensor 14, a door type cross beam 15, a longitudinal measuring rod 16 and a middle telescopic inductive sensor 17; the air flotation shaft system 2 is nested in the center position of the base 1; the static balance measuring platform 3 is arranged in the center position of the air flotation shaft system 2; the static balance measuring platform 3 includes a lower plate 3a of the static balance measuring platform, an upper plate 3b of the static balance measuring platform, two guide rods 3c, 3d, four driving rods 3e, 3f, 3g, 3h and three precise force sensors 3i, 3j, 3k; the two guide rods 3c, 3d are uniformly arranged on the lower plate 3a of the static balance measuring platform at an equal interval; the four driving rods 3e, 3f, 3g, 3h are uniformly arranged on the lower plate 3a of the static balance measuring platform at equal intervals; the upper plate 3b of the static balance measuring platform sleeves the two guide rods 3c, 3d; the three precise force sensors 3i, 3j, 3k are uniformly arranged on the upper plate 3b of the static balance measuring platform at equal intervals; the aligning and tilt regulating workbench 4 is arranged in the center position of the static balance measuring platform 3; the left upright column 5 and the right upright column 6 are symmetrically distributed at two sides of the air flotation shaft system 2 and are fixedly arranged on the base 1; the left upright column 5 is sleeved with the left upper transverse measuring rod 9 and the left lower transverse measuring rod 7 sequentially from the top to bottom in a mode of movable regulation; the left upper telescopic inductive sensor 10 is fixedly connected to the left upper transverse measuring rod 9; the left lower telescopic inductive sensor 8 is fixedly connected to the left lower transverse measuring rod 7; the right upright column 6 is sleeved with the right upper transverse measuring rod 13 and the right lower transverse measuring rod 11 sequentially from the top to bottom in a mode of movable regulation; the right upper lever type inductive sensor 14 is fixedly connected to the right upper transverse measuring rod 13; the right lower lever type inductive sensor 12 is fixedly connected to the right lower transverse measuring rod 11; two ends of the door type cross beam 15 are fixedly connected to the upper end of the left upright column 5 and the upper end of the right upright column 6; the door type cross beam 15 is sleeved with the longitudinal measuring rod 16 in a mode of movable regulation; and the middle telescopic inductive sensor 17 is fixedly connected to the longitudinal measuring rod 16.

The present invention starts from geometrical deviation of multiple stages of rotor/stator of the aircraft engine, amount of unbalance of rotor/stator, rigidity of rotor/stator and vibration amplitude of rotor/stator, considers the influence of the area of the assembly contact surface between two stages of rotors/stators, and sets the rotation speed of rotor/stator to be the climbing rotation speed (70%-85% of the maximum rotation speed) to obtain vibration amplitude parameters. According to the calculation method of the coaxiality, amount of unbalance, rigidity and vibration amplitude of multiple stages of rotor/stator, an objective function taking assembly phases as variables is established, a Monte Carlo method is used to solve the objective function, and a probability density function is solved according to a drawn distribution function to obtain the probability relationship between the contact surface runout of the rotor/stator of the aircraft engine and the final coaxiality, amount of unbalance, rigidity and vibration amplitude of multiple stages of rotor/stator, thereby realizing assembly optimization and distribution of tolerances of multiple stages of rotor/stator.

The deep learning regulation and control and assembly method and device for large-scale high-speed rotary equipment based on dynamic vibration response properties, provided by the present invention, are described in detail above. The present invention applies specific examples to illustrate the principles and implementations of the present invention, and the illustration of the above embodiments is merely for assisting in understanding the method and core idea of the present invention. Furthermore, for a person of ordinary skill in the art, according to the idea of the present invention, there will be changes in specific implementations and application scopes. In conclusion, the contents of the specification are not intended to limit the present invention.

The invention claimed is:

1. A deep learning regulation and control and assembly method for a large-scale high-speed rotary equipment based on dynamic vibration response properties, comprising:
    step 1: establishing coaxiality, amount of unbalance, rigidity and vibration amplitude models after multi-stage rotor and stator assembly;
    step 2: generating 10000 groups of contact surface runout data of each stage of rotor and stator according to a Monte Carlo method, substituting random numbers into coaxiality, amount of unbalance, rigidity and vibration amplitude formulae of multiple stages of rotor/stator, rotating a rotation angle of each stage of rotor and stator to obtain 10000 groups of coaxiality, amount of unbalance, rigidity and vibration amplitude parameters of multiple stages of rotor/stator, and solving a probability density function according to a drawn distribution function to obtain a probability relationship between the contact surface runout of the rotor/stator of an aircraft engine and a final coaxiality, amount of unbalance, rigidity and vibration amplitude of multiple stages of rotor/stator, thereby realizing distribution of tolerances of multiple stages of rotor/stator;
    step 3: establishing a BP neural network prediction model to accurately predict the coaxiality, amount of unbalance, rigidity and vibration amplitude after rotor and stator assembly, thereby realizing optimization of multi-stage rotor and stator assembly.

2. The method of claim 1, wherein in the step 1 after n-stage rotor and stator assembly, the accumulated eccentric error of a kth stage of rotor and stator caused by localization and orientation errors of each stage of rotor and stator is expressed as:

$$\begin{bmatrix} dx_{0-k} \\ dy_{0-k} \\ dz_{0-k} \end{bmatrix} = \sum_{i=1}^{k} \left( \prod_{j=2}^{i} S_{rj-1} S_{xj-1} S_{yj-1} \right) S_{ri}(p_i + dp_i), k = 1, 2, \ldots, n$$

wherein $dx_{0-k}$ the accumulative eccentricity error of the circle center of a measuring surface of the kth stage of rotor and stator in an X-axis direction after n-stage rotor and stator assembly; $dy_{0-k}$ is the accumulative eccentricity error of the circle center of the measuring surface of the kth stage of rotor and stator in an Y-axis direction after n-stage rotor and stator assembly; $dz_{0-k}$ is the accumulative eccentricity error of the circle center of the measuring surface of the kth stage of rotor and stator in the Z-axis direction after n-stage rotor and stator assembly; $p_i$ is an ideal location vector of the center of a circle of a radial measuring surface of the ith stage of rotor and stator; $dp_i$ is a processing error vector of the center of a circle of the radial measuring surface of the ith stage of rotor and stator; $S_{ri}$ is a rotation matrix of the ith stage of rotor and stator rotating by a $\theta_{ri}$ angle around the Z-axis; $S_{r1}$ is a unit matrix; $S_{xj-1}$ is a rotation matrix of a (j-1)th stage rotor and stator rotating by a $\theta_{xj-1}$ angle around the X-axis; $S_{yj-1}$ is a rotation matrix of the (j-1)th stage rotor and stator rotating by a $\theta_{yj-1}$ angle around the Y-axis; $S_{rj-1}$ is a rotation matrix of the (j-1)th stage rotor and stator rotating by a $\theta_{rj-1}$ angle around the Z-axis;

according to the ISO standard definition of the coaxiality, the expression of the coaxiality after n-stage rotor and stator assembly is:

$$\text{coaxiality} = \max\{2\sqrt{dx^2_{0-k} + dy^2_{0-k}}, k=1,2,\ldots,n\}$$

in multi-stage rotor and stator assembly, the amount of unbalance of the nth stage of rotor and stator caused by localization and orientation errors of each stage of rotor and stator is expressed as:

$$\begin{bmatrix} Ux_{0-n} \\ Uy_{0-n} \end{bmatrix} = \begin{bmatrix} m_{0-n} & 0 & 0 \\ 0 & m_{0-n} & 0 \end{bmatrix} \cdot \sum_{i=1}^{n} \left( \prod_{j=2}^{i} S_{rj-1} S_{xj-1} S_{yj-1} \right) S_{ri}(p_i + dp_i)$$

wherein $Ux_{0-n}$ is the amount of unbalance of a measuring surface of the nth stage of rotor and stator in the X-axis direction after assembly; $Uy_{0-n}$ is the amount of unbalance of the measuring surface of the nth stage of rotor and stator in the Y-axis direction after assembly; $m_{0-n}$ is the mass of the nth stage of rotor and stator after assembly;

the amount of unbalance of a single stage of rotor and stator and the amount of unbalance introduced by localization and orientation errors in the assembly process are subjected to vector addition to obtain single-stage amount of unbalance, the amount of unbalance of each stage of rotor and stator is separately projected to two correction surfaces, and initial amount of unbalance of multiple stages of rotor/stator is obtained according to a dynamic balance formula, thereby realizing calculation of the initial amount of unbalance of multiple stages of rotor/stator;

in multi-stage rotor and stator assembly, the sectional inertia moment I of an assembly contact surface between two stages of rotors/stators is:

$$I=\pi*(R^4-r^4)/64-2*\int_0^{de}\int_0^{d\theta}\pi*(R^4-r^4)/64 \, de \, d\theta$$

wherein R is the contact surface outer diameter, r is the contact surface inner diameter, eccentricity $de=\sqrt{(dx_{0-k})^2+(dy_{0-k})^2}$, eccentric angle $d\theta=\arctan(dy_{0-k}/dx_{0-k})$, rotor and stator bending rigidity is EI, E being elastic modulus of the material;

the kinetic equation of rotor and stator axis elements in a fixed coordinate system is:

$$(M_T^e+M_R^e)\ddot{q}^e - \Omega G^e \dot{q}^e + K_B^e q^e = Q^e$$

wherein $M_T^e$ is a mass matrix, $M_R^e$ is an inertia matrix, $G^e$ is a gyroscopic effect matrix, $\Omega$ is rotational angular speed of rotor/stator, $q^e$ is a generalized displacement vector, $K_B^e$ is a rigidity matrix; $Q^e$ is external force received by the system; the superscript e represents an axis element; the bending rigidity constitutes the rigidity matrix, the rotation speed of rotor/stator is set to be climbing rotation speed, and a finite element method is used to solve vibration amplitude parameters of the rotor and stator system.

3. The method of claim 2, wherein the climbing rotation speed is 70%-85% of the maximum rotation speed.

4. The method of claim 1, wherein in the step 3, based on multi-factor coupling properties of temperature, humidity, tightening torque, orientation error, localization error, amount of unbalance measuring error, cross-sectional area, correction surface location, bolt tightening sequence, material elastic modulus, rotor and stator height, contact surface radius, dynamic rigidity, rotation speed and bearing support rigidity in the assembly process of the large-scale high-speed rotary equipment, establishing a deep learning neural network prediction model taking as input variables the error factors of temperature, humidity, tightening torque, orientation error, localization error, amount of unbalance measuring error, cross-sectional area, correction surface location, bolt tightening sequence, material elastic modulus, rotor and stator height, contact surface radius, dynamic rigidity, rotation speed and bearing support rigidity of each stage of large-scale high-speed rotary equipment, and taking coaxiality, amount of unbalance, rigidity and vibration amplitude of the large-scale high-speed rotary equipment after assembly as output variables.

5. A device for realizing a deep learning regulation and control and assembly method for a large-scale high-speed rotary equipment based on dynamic vibration response properties, wherein the device comprises a base, an air flotation shaft system, a static balance measuring platform, an aligning and tilt regulating workbench, a left upright column, a right upright column, a left lower transverse measuring rod, a left lower telescopic inductive sensor, a left upper transverse measuring rod, a left upper telescopic inductive sensor, a right lower transverse measuring rod, a right lower lever type inductive sensor, a right upper transverse measuring rod, a right upper lever type inductive sensor, a door type cross beam, a longitudinal measuring rod and a middle telescopic inductive sensor;

wherein the air flotation shaft system is nested in the center position of the base;

wherein the static balance measuring table is arranged in the center position of the air flotation shaft system;

wherein the static balance measuring platform comprises a lower plate of the static balance measuring platform, an upper plate of the static balance measuring platform, two guide rods, four driving rods and three precise force sensors;

wherein the two guide rods are uniformly arranged on the lower plate of the static balance measuring platform at an equal interval;

wherein the four driving rods are uniformly arranged on the lower plate of the static balance measuring platform at equal intervals;

wherein the upper plate of the static balance measuring platform sleeves the two guide rods;

wherein the three precise force sensors are uniformly arranged on the upper plate of the static balance measuring platform at equal intervals;

wherein the aligning and tilt regulating workbench is arranged in the center position of the static balance measuring table;

wherein the left upright column and the right upright column are symmetrically distributed at two sides of the air flotation shaft system and are fixedly arranged on the base;

wherein the left upright column is sleeved with the left upper transverse measuring rod and the left lower transverse measuring rod sequentially from top to bottom in a mode of movable regulation;

wherein the left upper telescopic inductive sensor is fixedly connected to the left upper transverse measuring rod;

wherein the left lower telescopic inductive sensor is fixedly connected to the left lower transverse measuring rod;

wherein the right upright column is sleeved with the right upper transverse measuring rod and the right lower transverse measuring rod sequentially from top to bottom in a mode of movable regulation;

wherein the right upper lever type inductive sensor is fixedly connected to the right upper transverse measuring rod;

wherein the right lower lever type inductive sensor is fixedly connected to the right lower transverse measuring rod;

wherein the two ends of the door type cross beam are fixedly connected to the upper end of the left upright column and the upper end of the right upright column;

wherein the door type cross beam is sleeved with the longitudinal measuring rod in a mode of movable regulation; and wherein the middle telescopic inductive sensor is fixedly connected to the longitudinal measuring rod.

* * * * *